United States Patent

[11] 3,603,552

[72] Inventor Colin Wheelock
    Clevedon, England
[21] Appl. No. 876,935
[22] Filed Nov. 14, 1969
[45] Patented Sept. 7, 1971
[73] Assignee Mills Scaffold Company Limited
    London, England
[32] Priority Nov. 26, 1968
[33] Great Britain
[31] 55917/68

[54] ADJUSTABLE STRUTS
    4 Claims, 2 Drawing Figs.
[52] U.S. Cl. .................................................. 248/354 S,
    254/98
[51] Int. Cl. ................................................... F16m 13/00,
    E04g 25/04
[50] Field of Search .......................................... 248/354 S,
    405, 422; 287/58 CT; 254/13, 98, 102

[56] References Cited
    UNITED STATES PATENTS
    209,344   10/1878   Joyce ........................ 254/98
    324,644    8/1885   Bouvier ..................... 254/98
    743,290   11/1903   Ketterer .................... 254/98
    1,612,124 12/1926   Huelsick .................. 248/354 S X
    2,654,567 10/1953   James ...................... 254/98 X Primary Examiner—William H. Schultz
Attorney—A. Yates Dowell ABSTRACT: This invention relates to an adjustable telescopic strut with the inner member having a screw thread engaging a rotatable adjusting nut, in which the adjusting nut is readily disengageable from the screw thread to effect rapid adjustment of the strut.

PATENTED SEP 7 1971          3,603,552

Inventor
Colin Wheelock

ADJUSTABLE STRUTS

BACKGROUND OF THE INVENTION

1. Field of the Invention

This invention relates to adjustable struts of the kind herein called the kind specified, comprising inner and outer members of elongated form which telescope one within the other, the outer member being hollow to permit of the inner member telescoping therein, the inner member having a peripheral screw thread on which works a nut which is adapted for load-transmitting engagement with one end of the outer member, the arrangement being such that by rotating the nut the overall length of the strut can be adjusted.

2. Description of the Prior Art

Adjustable struts of the kind specified are often required to provide quite a wide range of adjustment so that the screw thread on the inner member may be of quite substantial length as much as 18 inches to 2 feet or even more and this means that the nut has to be turned many times in adjusting the overall length of the strut from one extreme to the other, the extent to which it is necessary to turn the nut being increased by the fact that to enable the nut to be turned manually under load the helix angle of the screw thread must be small, usually not more than about 10° so that the number of screw threads per unit length is greater than would be the case if a larger helix angle were possible.

The present invention has for its object the provision of an improved arrangement which permits of the adjustment of the axial position of the nut being more quickly and easily effected.

SUMMARY OF THE INVENTION

According to the present invention the nut is formed as two thread-carrying parts each extending around not more than half of the circumference of the threaded part of the inner member, said parts being connected hingedly together at positions spaced axially beyond one end of the nut thread, the arrangement being such that the nut parts can each be hinged out of threaded engagement with the screw thread on the inner member to permit of the nut being then displaced along the length of the inner member without rotating the nut, each of said parts of the nut having an outer member engaging face adapted to engage with the outer member at a position such in relation to the hinge position that with the outer member in load-transmitting engagement with the nut the parts thereof are held positively in threaded engagement with the inner members.

Thus with the present invention rapid adjustment of the overall length of the strut can be effected while there is no risk of the nut being inadvertently disengaged from the inner member while the strut is under load in that it would then be necessary to displace the outer member axially relative to the nut against the thrust of the strut loading before the nut parts could be relatively hinged out of threaded engagement with the inner member.

The abutment faces of the nut parts may be adapted to engage with the outer side of the wall of the hollow outer member, in which case each of these faces would be disposed at the side of the hinge position of the parts which in an axial sense is opposite to the screw threads on such parts, the arrangement preventing the said faces hinging inwardly towards the central axis of the inner member and thus precluding outward displacement of the nut parts away from the screw thread on the inner member.

Alternatively, the abutment faces may engage with the inner side of the wall of the hollow outer member, in which case such faces must in an axial sense be disposed at the same side of the hinge position as the screw threads of the several nut parts so as again to prevent them from being swung outwardly out of threaded engagement with the inner member when the strut is loaded.

Usually the hollow outer member would be in the form of a cylindrical tube but the member may be open along one side thereof if desired, so as to be of channel or open-sided tube configuration.

BRIEF DESCRIPTION OF THE DRAWINGS

One preferred form of the invention is illustrated in the accompanying drawings wherein.

DESCRIPTION OF THE PREFERRED EMBODIMENT

Figure 1:
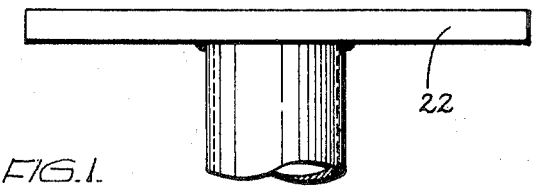
FIG. 1 is a side elevation of one form of adjustable strut incorporating the invention.
Figure 2:
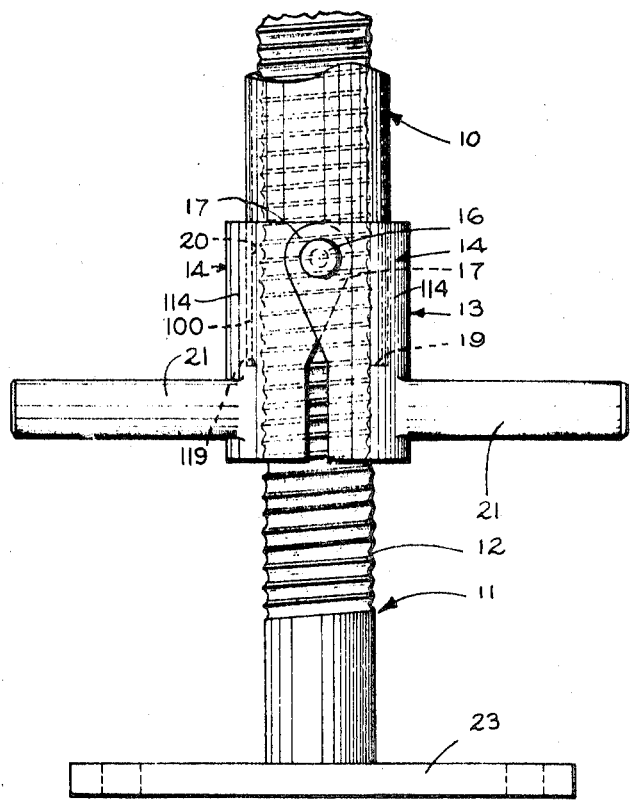
FIG. 2 is a plan view of the nut of the strut depicted in FIG. 1.
Figure 2:
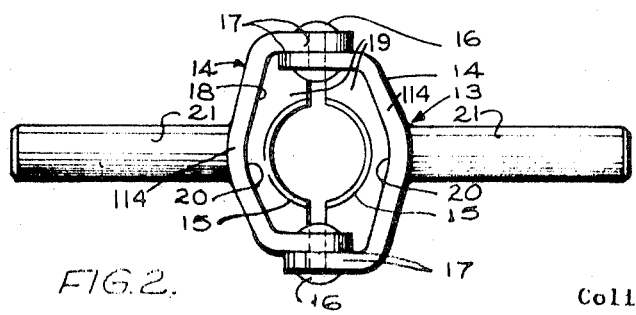

The adjustable strut illustrated comprises an outer member 10 in the form of a plain cylindrical tube and an inner member 11 having a peripheral screw thread 12 and one end of the inner member 11 extends telescopically within the outer member 10.

On the screw threaded part of the inner member 11 is mounted a nut 13 which is split along a diametrical axially extending plane into two similar parts 14 each having a screw threaded portion 15 which extends around rather less than half the circumference of the screw thread 12 so as normally to engage therewith.

The two-nut parts 14 at positions spaced axially beyond the end of the portions 15 are connected together by aligned hinge pins 16 which extend through hinge lugs 17 formed on each portion 14, the hinge pins and lugs forming pivot means. The lugs 17 form the extremities of abutment portions 114 of the parts 14 and extend beyond the pins 16 on the side thereof opposite to the screw threaded portions 15 to form a ring 18. The portions 15 provide shoulders 19 adapted for load-transmitting engagement with the end of the outer member 10 when this is within the ring.

The ring 18 has axially extending opposed abutment faces 20, which are disposed at opposite ends of a diameter extending perpendicular to the hinge axis and which over their entire axially extending length are spaced apart by a distance equal to the outside diameter of the outer member 10 so as to engage closely with abutment faces 100 on the outer side of the wall of the member 10 when within the ring.

Insofar as the socket faces 20 extend axially beyond the hinge axis at the side thereof opposite to the screw threaded portions 15 the arrangement effectively ensures that when the outer member 10 extends within the ring so as to be in load-transmitting engagement through shoulder 19 with the nut 13, the two-nut parts 14 are effectively held in threaded engagement with the screw thread on the inner member 11.

At the same time when the outer member 10 is no longer in load-transmitting engagement with the nut 13, it can be withdrawn from the ring 18 thus permitting of the two parts 14 of the nut being swung relatively apart by grasping the nut-rotating handles 21 and swinging them in an upward direction as viewed in FIG. 1 so as to disengage the threaded portions 15 from the inner member screw threads 12 and permit of the nut 13 being rapidly displaced without rotation, axially of the inner member 11 to some other desired position along the length of the inner member 11 in accordance with the desired overall length of the strut.

One end of each of the two members 10, 11 which are at opposite ends of the strut are respectively provided with upper and lower load-engaging thrust plates 22, 23 respectively.

I claim:

1. An adjustable strut comprising a hollow outer member; an externally threaded inner member telescopically engaged with the outer member; and a two-part nut to transmit load between the members, each part of the nut having an internal, part-screw-thread to engage the external screw thread on the inner member, each such part-screw-thread not extending around more than half the circumference of the inner member, and an abutment face, the nut including pivot means connecting the nut parts for relative pivoting movement of said parts about a pivot axis transverse to the longitudinal axes of said members, the abutment faces being located about the inner member, and abutment faces on said outer member located so that engagement of said faces on the outer member with said faces on the parts occurs when the strut is under axial load and causes the part-screw-threads of the nut parts to engage the external screw thread, said nut parts being pivotable about said pivot axis when the abutment faces are out of engagement to disengage the part-screw-threads from the external screw thread.

2. An adjustable strut according to claim 1 wherein said abutment faces are provided by the external circumferential surface of the outer member and inwardly directed faces on the nut parts.

3. A strut according to claim 2 including interengageable load-transmitting faces on the nut parts at one end of the part-screw-threads and one end of the outer member.

4. An adjustable strut according to claim 1 including handles on the nut parts operative to rotate the nut when the part-screw-threads are engaged with the external screw thread.